US006476318B1

(12) United States Patent
Lee

(10) Patent No.: US 6,476,318 B1
(45) Date of Patent: Nov. 5, 2002

(54) SIGNAL CABLE CONNECTOR

(75) Inventor: Chang-Chi Lee, Yun-Lin Shian (TW)

(73) Assignee: Rich Electric Wire & Cable Co., Ltd., Yun-Lin Shian (TW)

( * ) Notice: Subject to any disclaimer, the term of this patent is extended or adjusted under 35 U.S.C. 154(b) by 0 days.

(21) Appl. No.: 10/020,278

(22) Filed: Dec. 18, 2001

(51) Int. Cl.[7] .................................................. H02G 3/18

(52) U.S. Cl. ......................... 174/59; 439/350; 439/372; 439/607; 439/717; 339/45 M; 339/66 M; 339/91 R; 174/65 R; 174/65 SS; D13/133; D13/147; D13/154

(58) Field of Search ................................ 174/59, 65 R, 174/65 SS; 439/98; 361/772; 29/755; D13/133; 191/1 R

(56) References Cited

U.S. PATENT DOCUMENTS 4,579,408 A * 4/1986 Sasaki ........................ 439/153
4,709,975 A * 12/1987 Williams, II ................ 439/350
D315,719 S * 3/1991 Cusumano et al. ........ D13/154
D417,655 S * 12/1999 Lin et al. ................... D13/147
6,036,543 A * 3/2000 Panis et al. ................. 439/607

* cited by examiner

*Primary Examiner*—Anthony Dinkins
*Assistant Examiner*—Anton B Harris
(74) *Attorney, Agent, or Firm*—Rosenberg, Klein & Lee

(57) ABSTRACT

A signal cable connector comprised of a lower housing, an upper housing, four fan-shaped levers, two squeeze buttons, a connector shell, a signal cable, a plastic body, and a fastening component. The structural innovations of the present invention include the profiling of gear teeth on the fan-shaped levers that minimize physical effort during connector removal and, furthermore, are simultaneously articulated into convergence to automatically dislodge the signal cable connector from equipment panels.

1 Claim, 3 Drawing Sheets

SIGNAL CABLE CONNECTOR

BACKGROUND OF THE INVENTION

1) Field of the Invention

The invention herein relates to a signal cable connector comprised of a lower housing, an upper housing, four fan-shaped levers, two squeeze buttons, a connector shell, a signal cable, a plastic body, and a fastening component, the structural innovations of which include the profiling of gear teeth on the fan-shaped levers that minimize physical effort during connector removal and, furthermore, that are simultaneously articulated into convergence to automatically dislodge the signal cable connector from equipment panels.

2) Description of the Prior Art

Conventional signal cable connectors are utilized to establish continuity between the connectors of household audio-video equipment, with the said signal cable connectors having 20 built-in contacts to conduct signals of varying frequencies and formats such as the audio, composite video, S-VHS (super VHS) video, and component video signals widely used by household audiovisual appliances. Since the conventional signal cable connectors linking household audio-video equipment are typically extended length conductor interfaces and, furthermore, have a high number of contacts, when the said signal cable connectors are plugged into or unplugged from equipment, the frictional resistance encountered is of considerable magnitude and even requires rocking to the left and right before manual force is sufficient to achieve removal; however, such procedures often result in the serious shortcomings of shape deformity and poor contact.

In view of the existent technological drawbacks of conventional product structures, the inventor of the invention herein originated several innovations based on professional knowledge and extensive design experience gained while engaged in the related fields that culminated in the successful design of the improved structure signal cable connector of the present invention.

SUMMARY OF THE INVENTION

The objective of the invention herein is to provide a signal cable connector, the structural innovations of which include the profiling of gear teeth on four fan-shaped levers to minimize physical effort during removal and, furthermore, that are simultaneously articulated into convergence to automatically dislodge the signal cable connector from equipment panels, a feature that effectively enhances the practical value of signal cable connectors.

To enable the examination committee to further understand the structural characteristics and technological content as well as the advantages and innovative features of the invention herein, the brief description of the drawings below is followed by the detailed description of the invention herein.

DETAILED DESCRIPTION OF THE INVENTION

Figure 1:
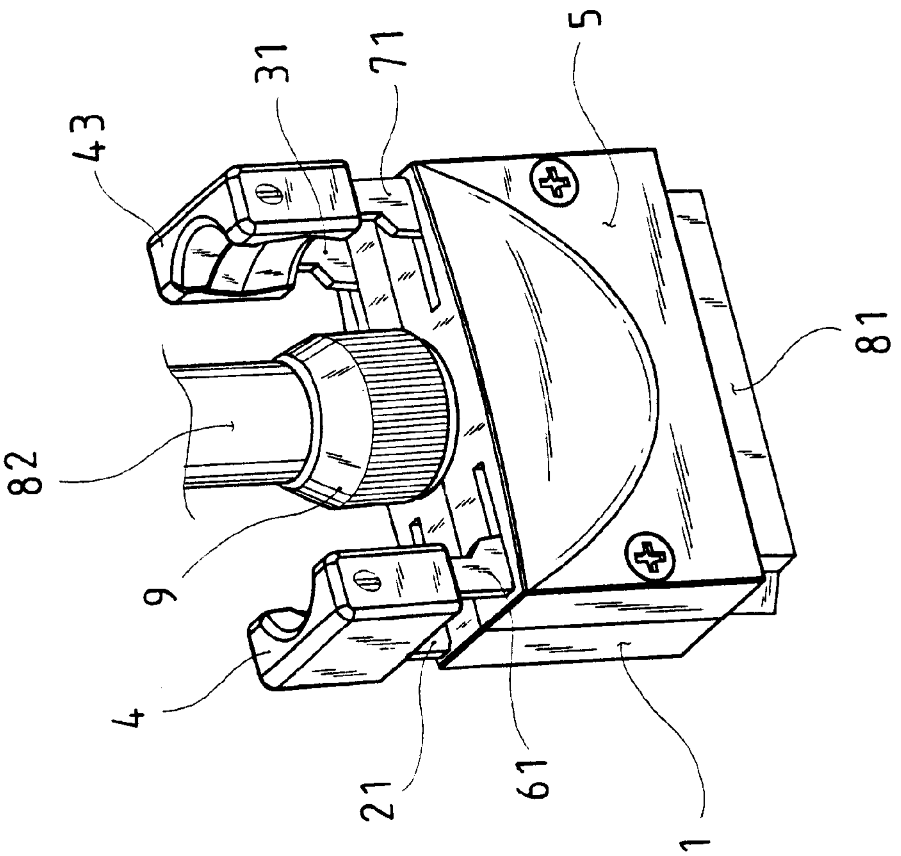
FIG. 1 is an isometric drawing of the invention herein.
Figure 2:
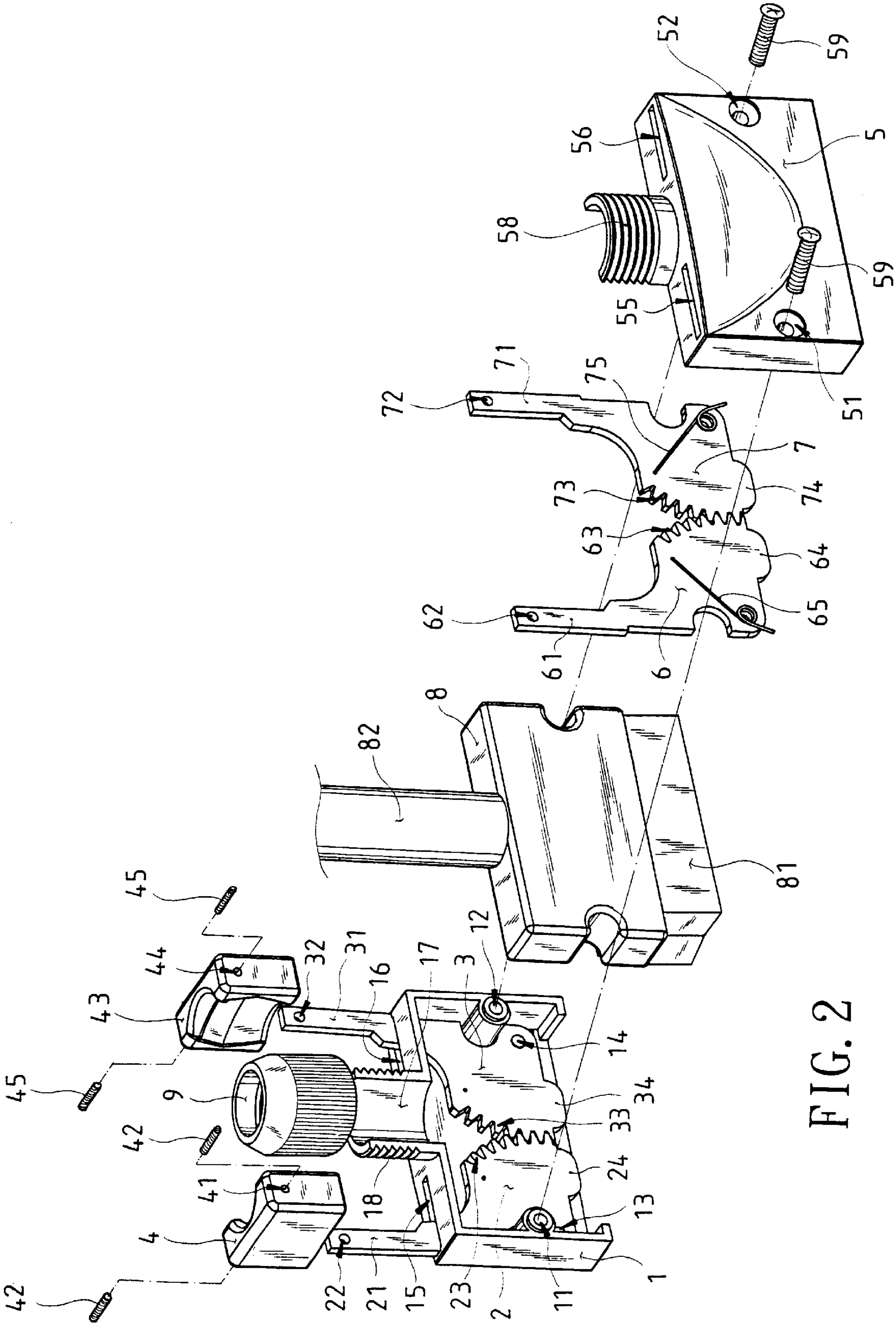
FIG. 2 is an exploded drawing of the invention herein.

Referring to FIG. 1 and FIG. 2, the signal cable connector of the invention herein is comprised of a lower housing 1, an upper housing 5, four fan-shaped levers 2, 3, 6, and 7, two squeeze buttons 4 and 43, a connector shell 81, a signal cable 82, a plastic body 8, and a fastening component 9, of which:

The lower housing 1 is a multi-sided framework having a tapped mounting post 11 and 12 respectively centered at the interior section of its two sides, a fulcrum shaft 13 and 14 projecting at the lower extent of the said tapped mounting posts 11 and 12, respectively, two elongated holes 15 and 16 formed in the top edge of the said lower housing 1 and, furthermore, a semicircular channel 17 disposed at the center interior section of the said lower housing 1, with the said semicircular channel 17 having external threads 18 formed along its exterior.

The upper housing 5 is a multi-sided framework having a screw hole 51 and 52 respectively formed in the center at the interior section of its two sides, a fulcrum shaft projecting at the lower extent of the said screw holes 51 and 52, respectively, two elongated holes 55 and 56 formed in the top edge of the said lower housing 5 and a semicircular channel disposed at the center interior section of the said upper housing 5, with the said semicircular channel having external threads 58 formed along its exterior. (The fulcrum shafts and semicircular channel of the said upper housing 5 are not shown in the drawings.)

The fan-shaped lever 2 has a union shank 21 at its upper edge and a hole 22 is disposed in the top end of the said union shank 21; gear teeth 23 are formed along the curved side of the said fan-shaped lever 2 and, furthermore, a lifting lobe 24 projects downward at the bottom edge of the said fan-shaped lever 2; the union shank 21 of the fan-shaped lever 2 is extended through the elongated hole 15 of the said lower housing 1, while a hole laterally disposed in the bottom edge of the said fan-shaped lever 2 with a wound spring situated at its rear extent (The said hole and wound spring are not shown in the drawings.) is sleeved onto the fulcrum shaft 13 of the said lower housing 1.

The fan-shaped lever 3 has a union shank 31 at its upper edge and a hole 32 is disposed in the top end of the said union shank 31; gear teeth 33 are formed along the curved side of the said fan-shaped lever 3 and, furthermore, a lifting lobe 34 projects downward at the bottom edge of the said fan-shaped lever 2; and a hole is laterally disposed in the bottom edge of the said fan-shaped lever 2 with a wound spring situated at its rear extent (The said hole and wound spring are not shown in the drawings.) is sleeved onto the fulcrum shaft 14 of the said lower housing 1, thereby enabling the enmeshing of the gear teeth 23 and 33 of the fan-shaped levers 2 and 3.

The fan-shaped lever 6 has a union shank 61 at its upper edge and a hole 62 is disposed in the top end of the said union shank 61; gear teeth 63 are formed along the curved side of the said fan-shaped lever 6 and, furthermore, a lifting lobe 64 projects downward at the bottom edge of the said fan-shaped lever 6; the union shank 61 of the fan-shaped lever 6 is extended through the elongated hole 55 of the said upper housing 5, while a hole laterally disposed in the bottom edge of the said fan-shaped lever 6 with a wound spring 65 situated at its rear extent is sleeved onto the fulcrum shaft of the said upper housing 5.

The fan-shaped lever 7 has a union shank 71 at its upper edge and a hole 72 is disposed in the top end of the said union shank 71; gear teeth 73 are formed along the curved side of the said fan-shaped lever 7 and, furthermore, a lifting lobe 74 projects downward at the bottom edge of the said fan-shaped lever 7; and a hole is laterally disposed in the bottom edge of the said fan-shaped lever 7 with a wound spring 75 situated at its rear extent is sleeved onto the fulcrum shaft of the said upper housing 5, thereby enabling the enmeshing of the gear teeth 63 and 73 of the fan-shaped levers 6 and 7.

The connector shell 81 is a hood-like structure of punch-fabricated metal construction and a plurality of connector pins arrayed in two rows are disposed along the interior section of the connector shell 81; a signal cable 82 consists of numerous individual wires and is soldered to the rear section of the said connector shell 81; and the plastic body 8 is an injection molded enclosure situated between the connector shell 81 and the signal cable 82. The lower housing 1 and the upper housing 5 constituting its top and bottom sides, respectively, are aligned together and, furthermore, two screws 59 are respectively inserted into the screw holes 51 and 52 of the upper housing 5 and then fastened to the tapped mounting posts 11 and 12 of the lower housing 1; the squeeze button 4 has a screw hole 41 formed in each of its two sides, and two screws 42 are respectively inserted through the union shank 21 and 61 holes 22 and 62 of the fan-shaped levers 2 and 6 and fastened therein; the other squeeze button 43 has a screw hole 44 formed in each of its two sides, two screws 45 are respectively inserted through the union shank 3 and 7 holes 32 and 72 of the fan-shaped levers 3 and 7 and fastened therein; furthermore, the said fastening component 9 is installed onto the external threads 18 and 58 at the top edges and rear sides of the lower housing 1 and the upper housing 5 to complete the assembly of the signal cable connector of the present invention.

Figure 4:
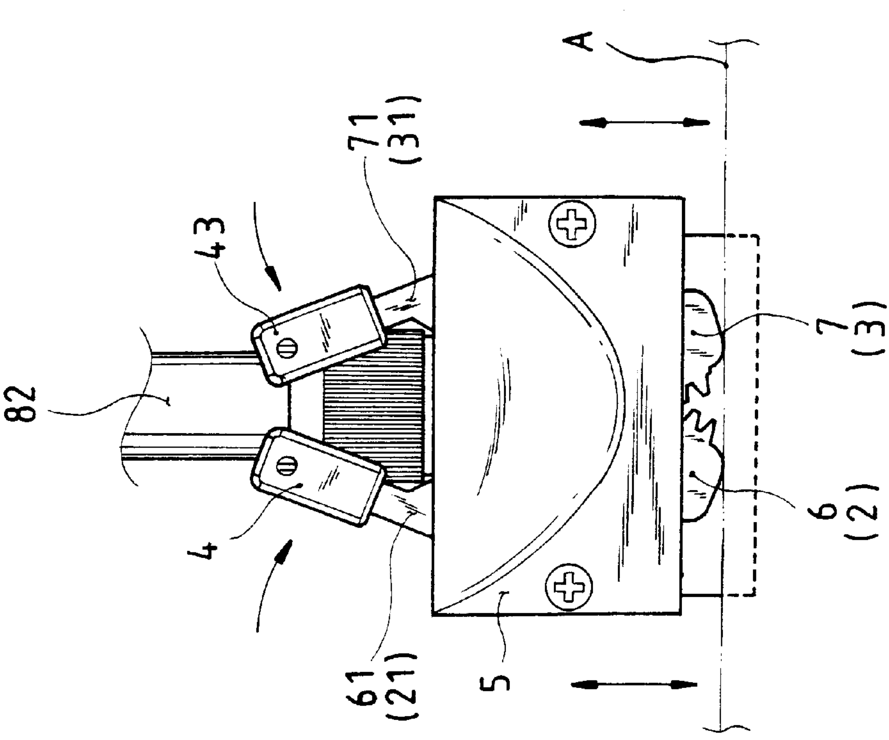
FIG. 4 is an orthographic drawing of the invention herein that illustrates its operation.
Figure 3:
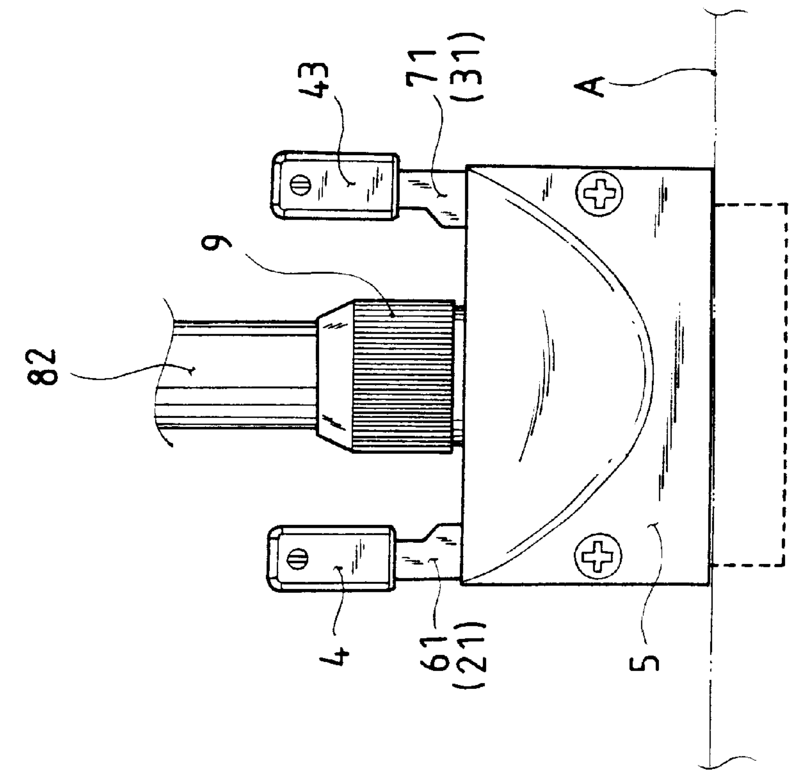
FIG. 3 is an orthographic drawing of the invention herein that illustrates its operation.

Given the assembled structural components of the invention herein, referring to FIG. 3 and FIG. 4, the said signal cable connector is plugged into the female socket of audio-video equipment A and the fan-shaped lever union shanks 61, 21, 71, and 31 extend outward and, furthermore, are postured in a perpendicular state; when the user wants to unplug the signal cable connector, the user only has to press the squeeze buttons 4 and 43 together, at which time the said four fan-shaped levers 2, 3, 6, and 7 simultaneously converge inward such that their lifting lobes 24, 34, 64, and 74 situated against the panel of the audio-video equipment A automatically dislodges the signal cable connector in an effort-saving and stable operation; when the squeeze buttons 4 and 43 are released, the four fan-shaped levers 2, 3, 6, and 7 of the present invention are restored back to their original perpendicular state by the wound springs at their back sides.

In summation of the foregoing section, since the disclosed structure of the invention herein is capable of achieving the claimed objectives and is of greater practical value and functionality, the invention herein is submitted to the examination committee for review in application for the granting of the commensurate patent rights.

What is claimed is:

1. A signal cable connector comprised of a lower housing, an upper housing, four fan-shaped levers, two squeeze buttons, a connector shell, a signal cable, a plastic body, and a fastening component, of which:

the said lower housing is a multi-sided framework having a tapped mounting post respectively centered at the interior section of its two sides, a fulcrum shaft projecting at the lower extent of the said tapped mounting posts, respectively, two elongated holes formed in the top edge of the said lower housing, a semicircular channel disposed at the center interior section of the said lower housing, with the said semicircular channel having external threads formed along its exterior;

the said upper housing is a multi-sided framework having a screw hole respectively formed in the center at the interior section of its two sides, a fulcrum shaft projecting at the lower extent of the said screw holes, respectively, two elongated holes formed in the top edge of the said lower housing, and a semicircular channel disposed at the center interior section of the said upper housing, with the said semicircular channel having external threads formed along its exterior;

the first said fan-shaped lever has a union shank at its upper edge and a hole is disposed in the top end of the said union shank; gear teeth are formed along the curved side of the said fan-shaped lever and, furthermore, a lifting lobe projects downward at the bottom edge of the said fan-shaped lever; the said union shank of the said fan-shaped lever is extended through the said elongated hole of the said lower housing, while a hole laterally disposed in the bottom edge of the said fan-shaped lever with a wound spring situated at its rear extent is sleeved onto the said fulcrum shaft of the said lower housing;

the second said fan-shaped lever has a union shank at its upper edge and a hole is disposed in the top end of the said union shank; gear teeth are formed along the curved side of the said fan-shaped lever and, furthermore, a lifting lobe projects downward at the bottom edge of the said fan-shaped lever; the said union shank of the said fan-shaped lever is extended through the said elongated hole of the said lower housing, while a hole laterally disposed in the bottom edge of the said fan-shaped lever with a wound spring situated at its rear extent is sleeved onto the said fulcrum shaft of the said lower housing, thereby enabling the enmeshing of the said gear teeth and of the first and the second said fan-shaped levers;

the third said fan-shaped lever has a union shank at its upper edge and a hole is disposed in the top end of the said union shank; gear teeth are formed along the curved side of the said fan-shaped lever and, furthermore, a lifting lobe projects downward at the bottom edge of the said fan-shaped lever; the said union shank of the said fan-shaped lever is extended through the said elongated hole of the said upper housing, while a hole laterally disposed in the bottom edge of the said fan-shaped lever with a wound spring situated at its rear extent is sleeved onto the said fulcrum shaft of the said upper housing;

the fourth said fan-shaped lever has a union shank at its upper edge and a hole is disposed in the top end of the said union shank; gear teeth are formed along the curved side of the said fan-shaped lever and, furthermore, a lifting lobe projects downward at the bottom edge of the said fan-shaped lever; the union shank of the fan-shaped lever is extended through the said elongated hole of the said upper housing, while a hole laterally disposed in the bottom edge of the said fan-shaped lever with a wound spring situated at its rear extent is sleeved onto the said fulcrum shaft of the said upper housing, thereby enabling the enmeshing of the said gear teeth of the third and the fourth said fan-shaped levers;

the said connector shell is a hood-like structure of punch-fabricated metal construction and a plurality of connector pins arrayed in two rows are disposed along the interior section of the said connector shell; the said signal cable consists of numerous individual wires and is soldered to the rear section of the said connector shell; and the said plastic body is an injection molded enclosure situated between the said connector shell and the said signal cable, the said lower housing and the said upper housing constituting its top and bottom sides, respectively, are aligned together and, furthermore, two screws are respectively inserted into the said screw holes of the said upper housing and then fastened to the said tapped mounting posts of the said lower housing; the first said squeeze button has a screw hole formed in each of its two sides, and two screws are respectively inserted through the said union shank holes of the first and third said fan-shaped levers and fastened therein; the second said squeeze button has a screw hole formed in each of its two sides, two screws are respectively inserted through the said union shank holes of the second and fourth said fan-shaped levers and fastened therein; furthermore, the said fastening component is installed onto the said external threads at the top edges and rear sides of the said lower housing and the said upper housing.

* * * * *